March 23, 1954 W. W. MAHER 2,672,837
MACHINE FOR APPLYING UNITING MATERIALS
TO ARTICLES AND FOR ASSEMBLING THEM
Filed Aug. 23, 1949 8 Sheets-Sheet 1
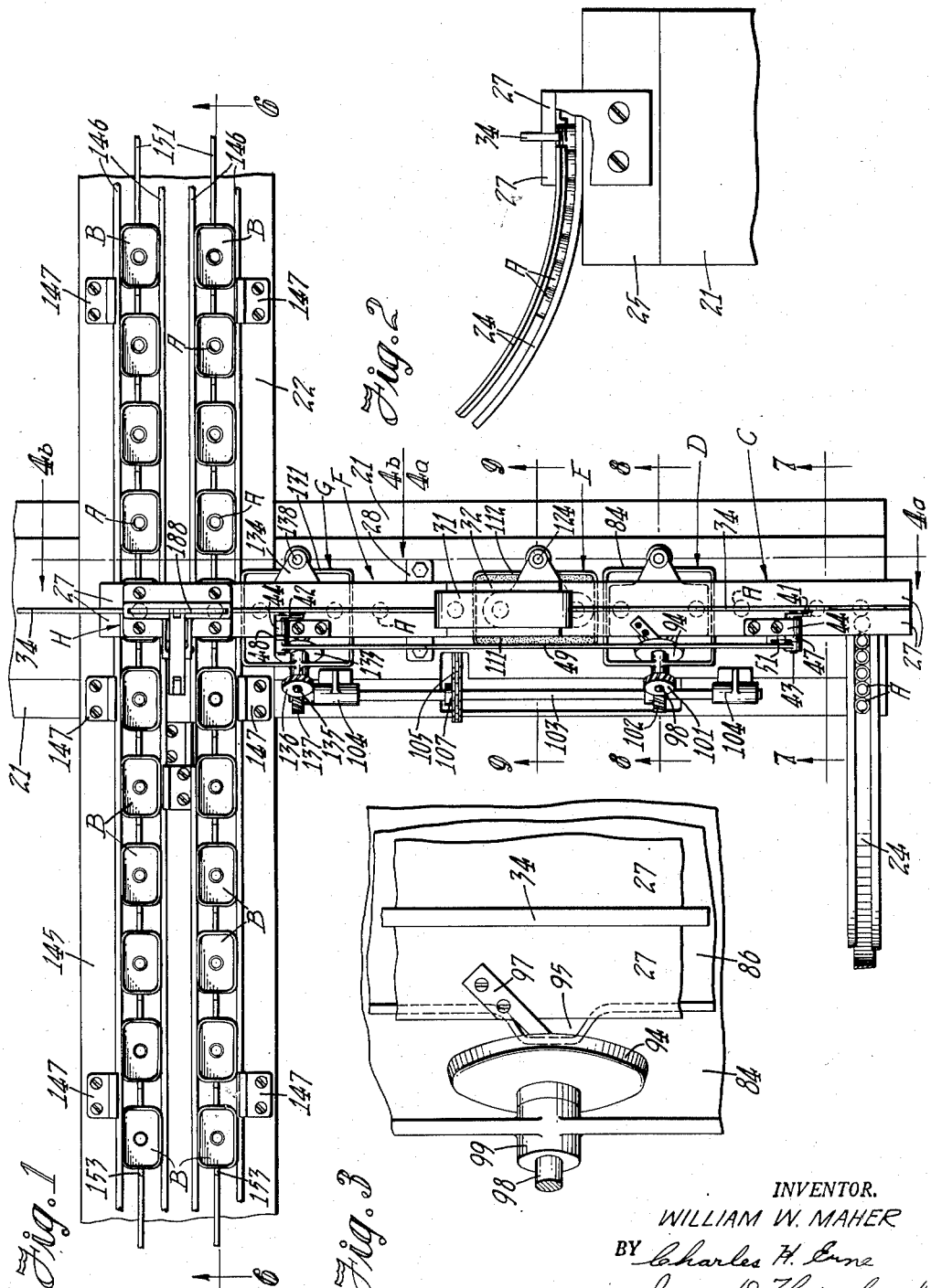
INVENTOR.
WILLIAM W. MAHER
BY Charles H. Enns
Ivan D. Thornburgh
ATTORNEYS

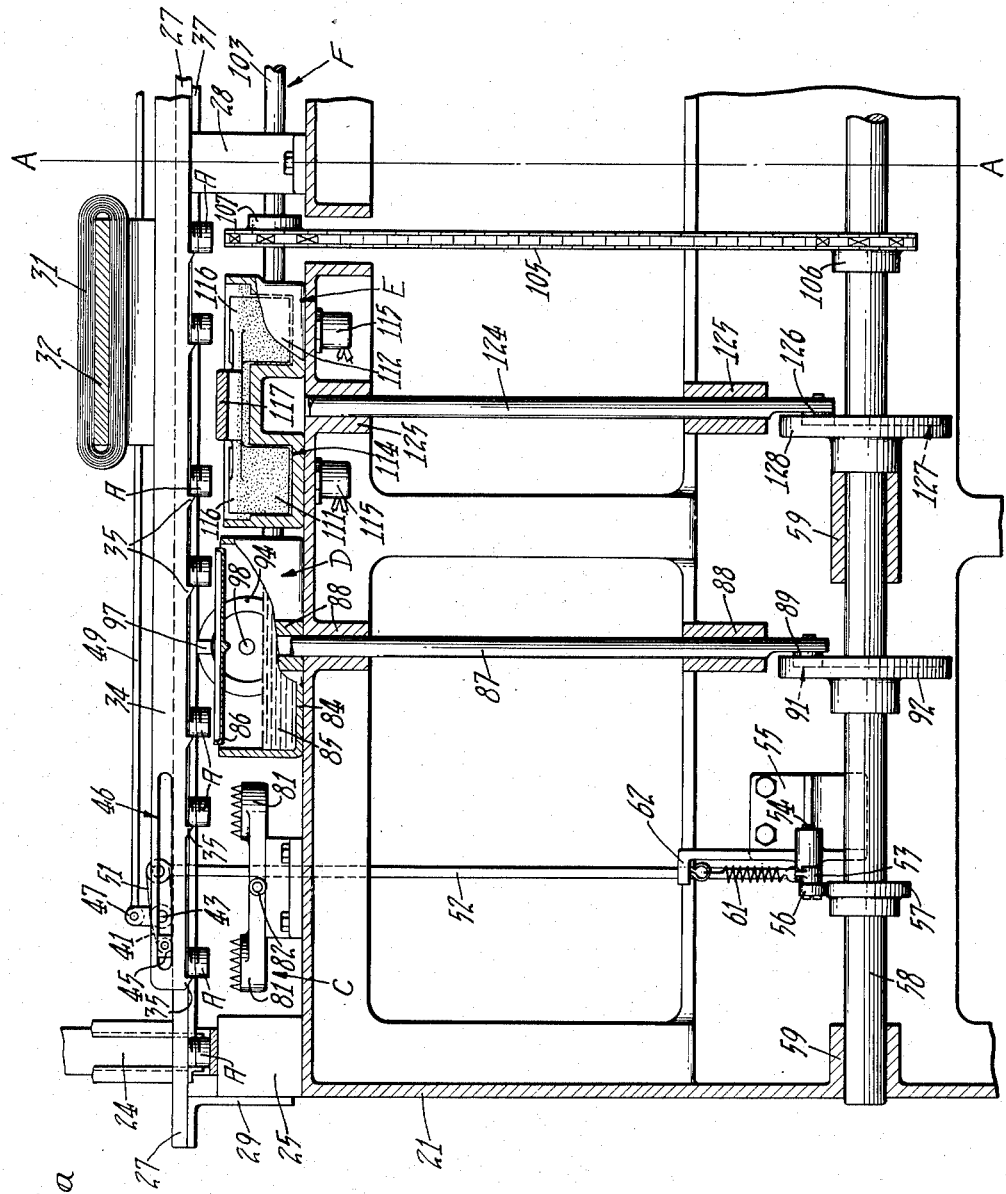

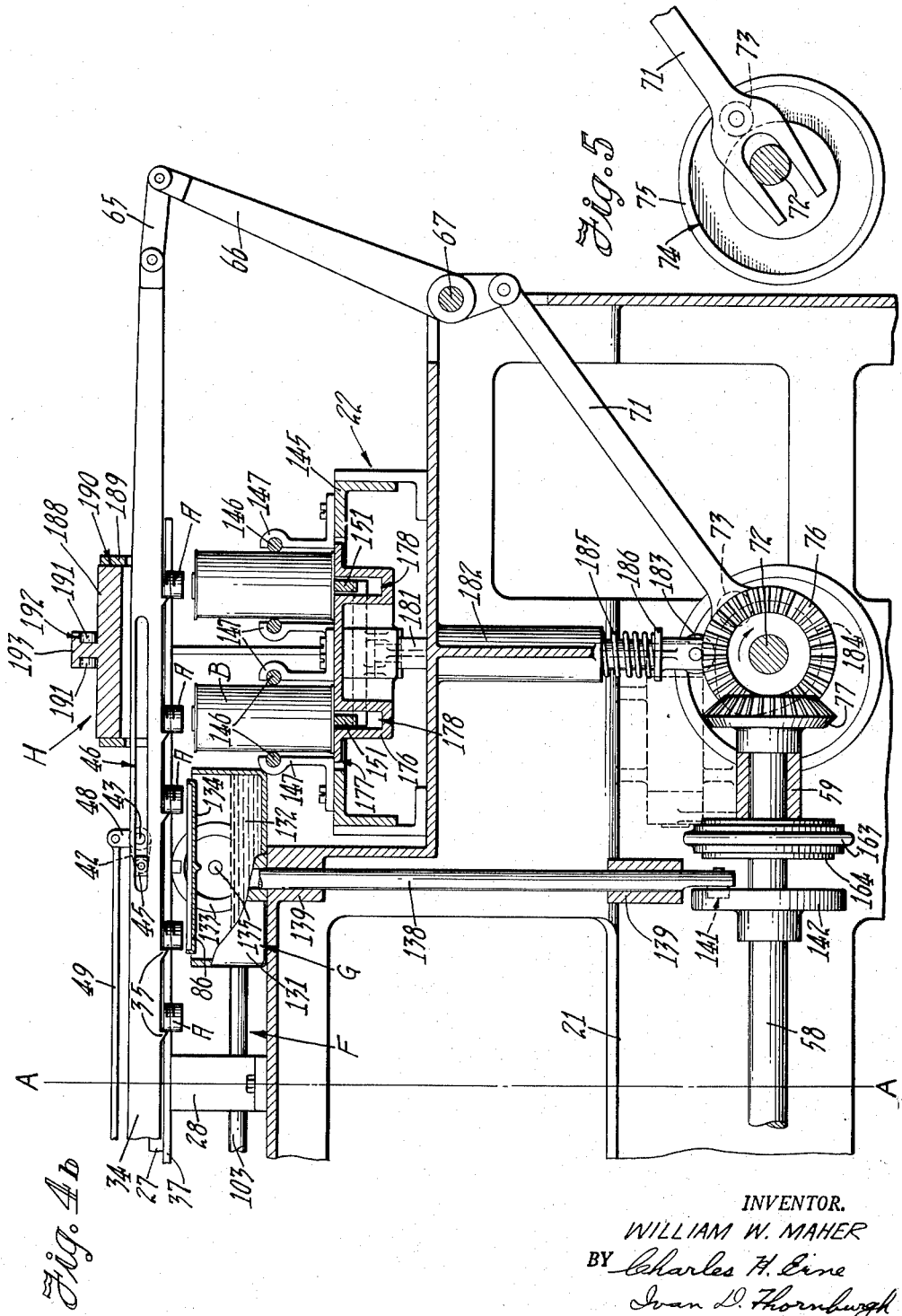

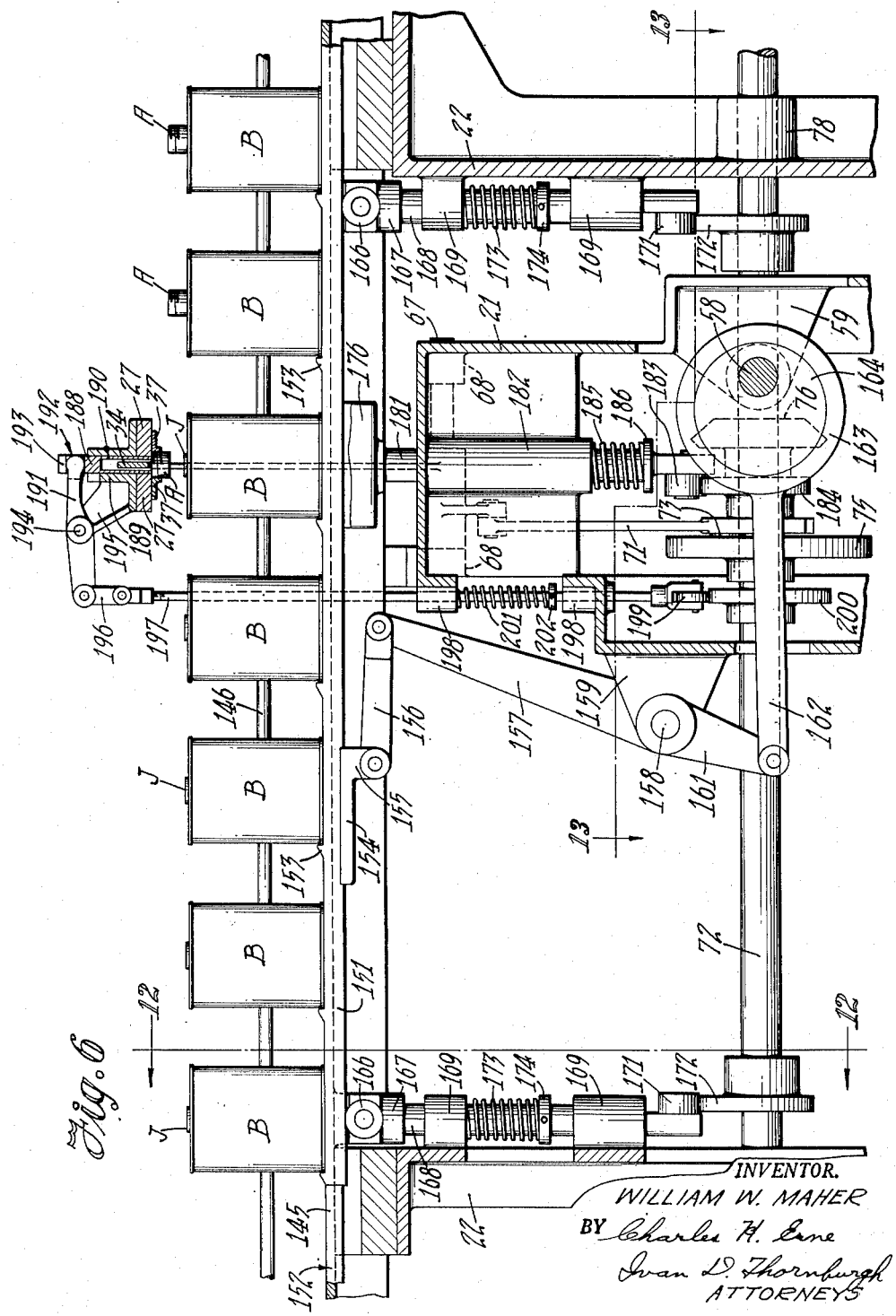

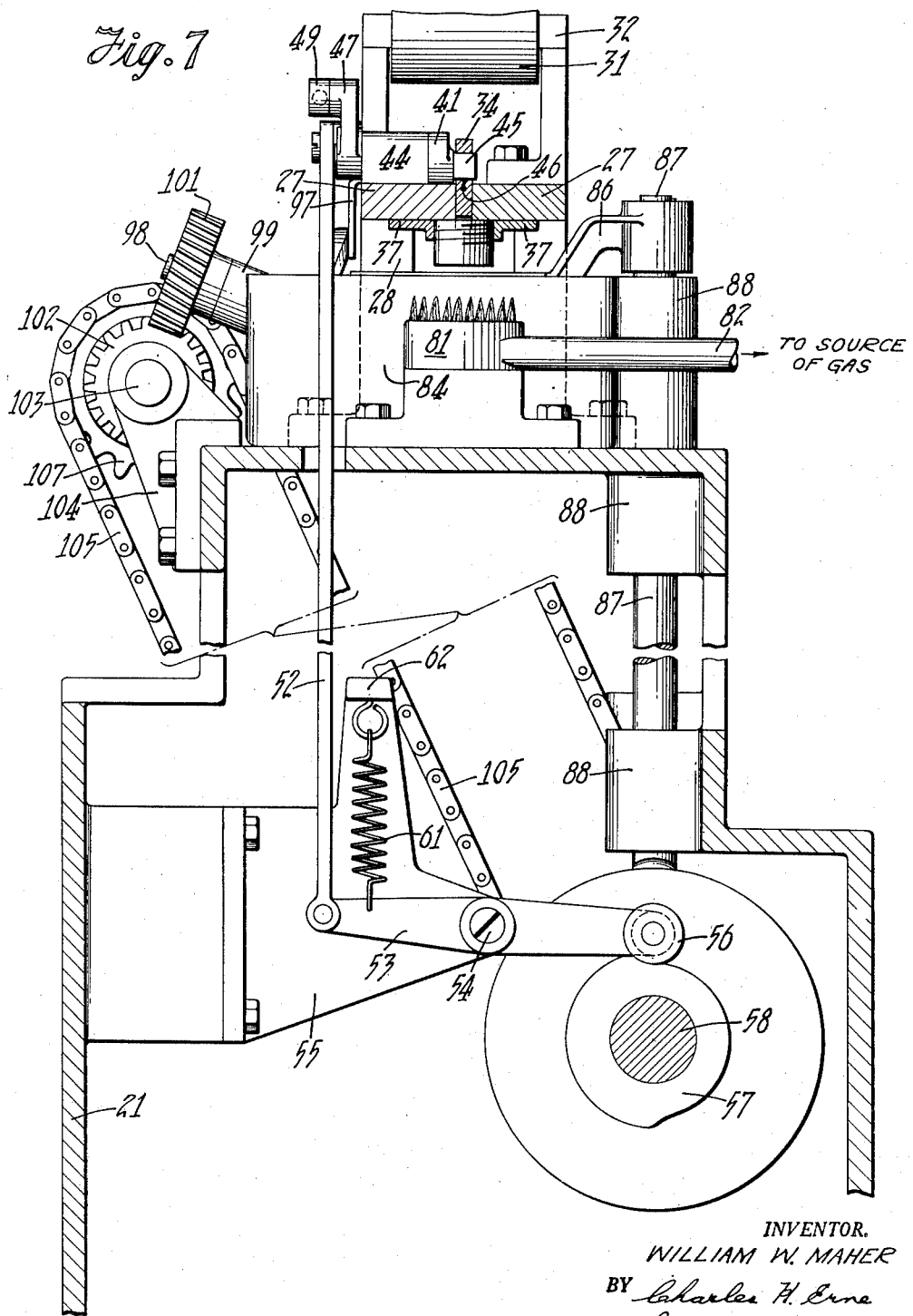

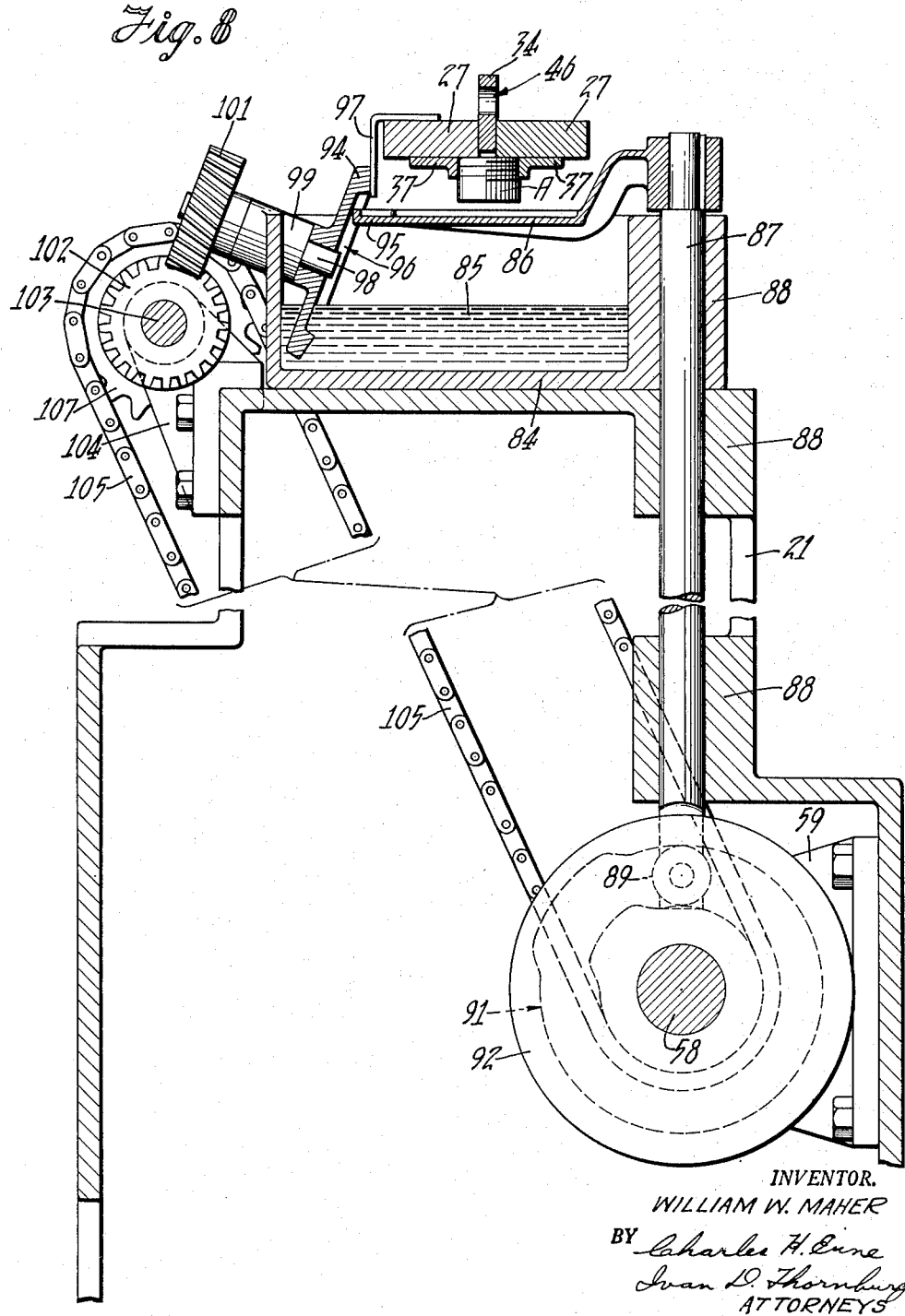

INVENTOR.
WILLIAM W. MAHER
BY Charles H. Erne
Ivan D. Thornburgh
ATTORNEYS

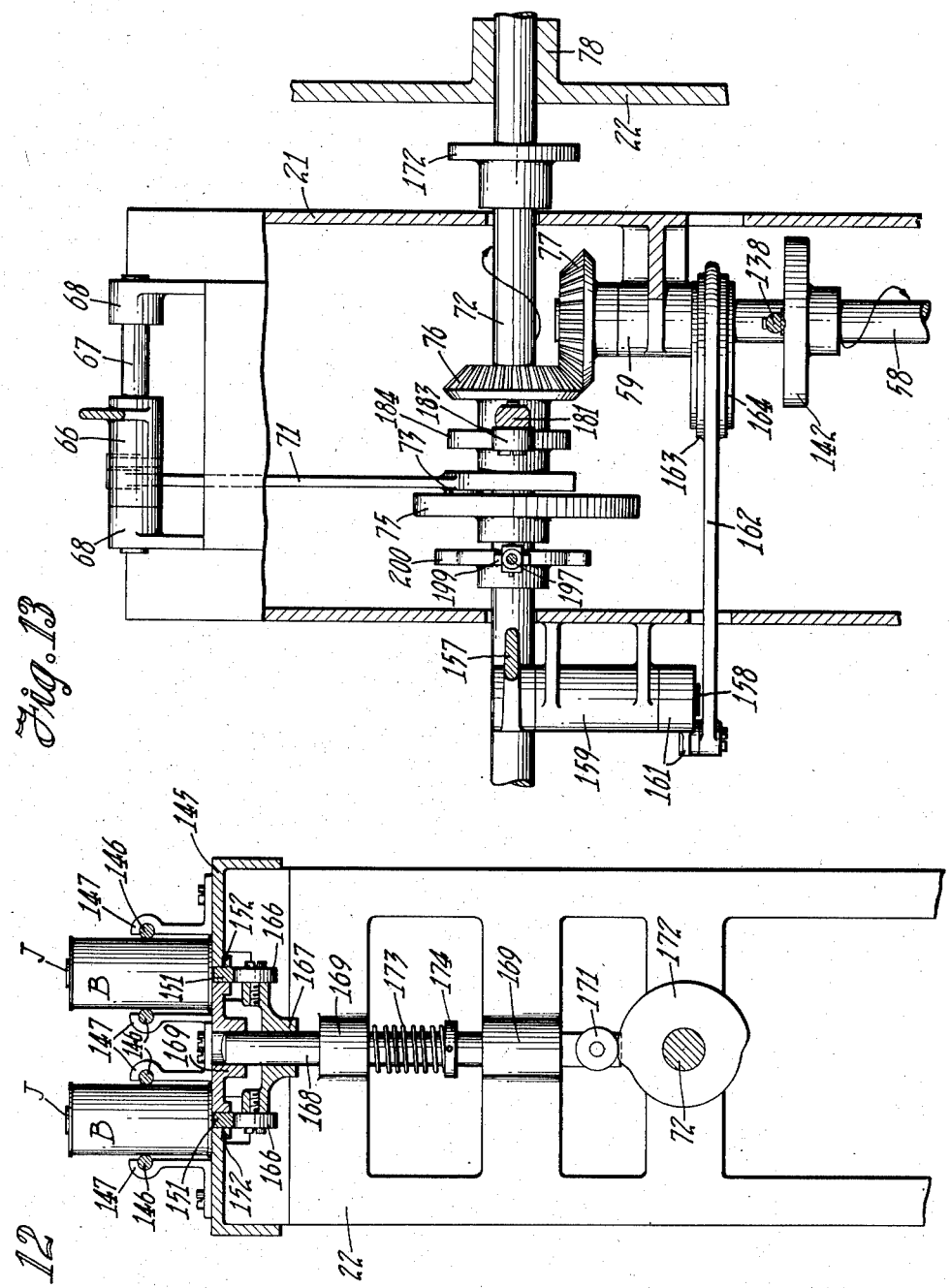

Patented Mar. 23, 1954

2,672,837

UNITED STATES PATENT OFFICE 2,672,837

MACHINE FOR APPLYING UNITING MATERIALS TO ARTICLES AND FOR ASSEMBLING THEM

William W. Maher, San Francisco, Calif., assignor to American Can Company, New York, N. Y., a corporation of New Jersey Application August 23, 1949, Serial No. 111,852

5 Claims. (Cl. 113—59)

The present invention relates to a machine for assembling and securing together articles such as container or can parts and/or their fittings and has particular reference to devices for applying uniting materials such as fluxes, solders, cements or other adhesives to the parts or fittings and for assembling them for the securing operation.

This is a companion application to my co-pending United States applications Serial No. 111,854, filed August 23, 1949, on Liquid Adhesive Applying Mechanism with Piston Feed, and Serial No. 111,853, filed August 23, 1949, on Fluxing Mechanism with Movable Flux Applying Device.

The invention contemplates the provision of a machine for applying for example flux and solder to container nozzles and for assembling the nozzles with the containers for sweating thereto although the invention is equally well adapted to preparing and assembling various other can parts and fittings and to the use of other adhesive materials preparatory to the assembling operation.

An object of the invention is the provision in an assembling and sweating machine of several co-operating devices whereby better control may be had over the amount of flux and solder applied to the can parts with the result that the can parts may be treated and assembled while moving along a predetermined path of travel with maximum speed, efficiency and economy.

Another object of the invention is the provision in such a machine of co-ordinated devices for effectively feeding and aligning articles or article parts to be ultimately assembled with each other and with a uniting material such as flux and solder without interference with the various operations and without depositing such flux and solder in undesired places.

Numerous other objects and advantages of the invention will be apparent as it is better understood from the following description, which, taken in connection with the accompanying drawings, discloses a preferred embodiment thereof.

Referring to the drawings:

Figure 1 is a top plan view of a machine embodying the instant invention, with parts broken away;

Fig. 2 is an enlarged elevation of devices for feeding nozzles or other can parts into the machine shown in Fig. 1, with parts broken away;

Fig. 3 is an enlarged fragmentary top plan detail of one of the fluxing devices used in the machine;

Figure 9:
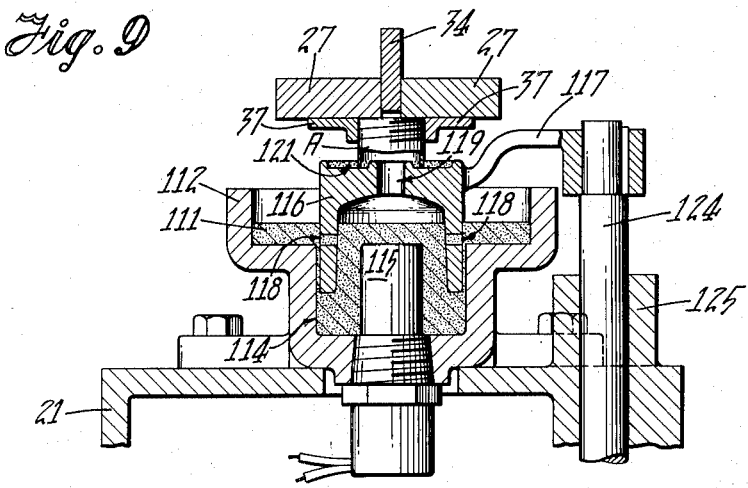
Figure 10:
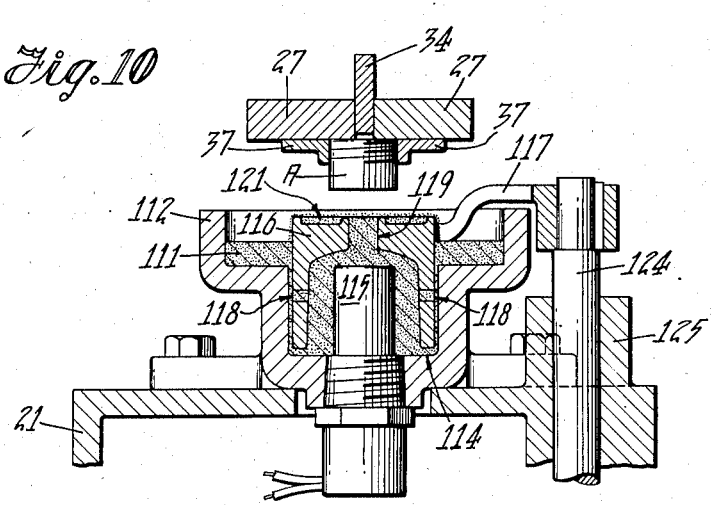
Figure 11:
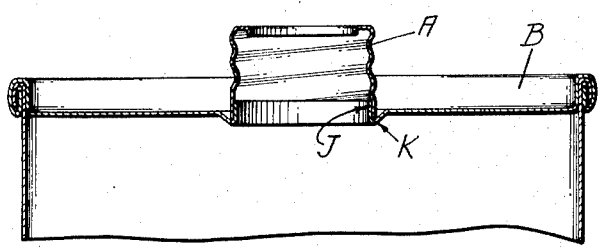

Figs. 4a and 4b together constitute an enlarged sectional view taken substantially along the line 4—4 in Fig. 1, with parts broken away;

Fig. 5 is an elevational detail of a portion of Fig. 4b, with a part broken away;

Fig. 6 is an enlarged sectional view taken substantially along the line 6—6 in Fig. 1, with parts broken away;

Figs. 7 and 8 are enlarged transverse sectional views taken substantially along the lines 7—7, 8—8 in Fig. 1, with parts broken away;

Figs. 9 and 10 are enlarged transverse sectional views taken substantially along the line 9—9 in Fig. 1, the views showing certain of the movable parts in different positions, with parts broken away;

Fig. 11 is an enlarged view of a can having a fitting to be secured thereto, with part of the can broken away;

Fig. 12 is a transverse sectional view taken substantially along the line 12—12 in Fig. 6, with parts broken away; and Fig. 13 is a horizontal section taken substantially along the broken lines 13—13 in Fig. 6, with parts broken away.

As a preferred or exemplary embodiment of the instant invention the drawings illustrate a machine for preparing sheet metal nozzles A (Fig. 11) and for simultaneously advancing them along a predetermined path of travel to meet and be assembled with sheet metal cans B. moving along another path of travel, preparatory to permanently sweating the nozzles in place on the cans to produce the well known pouring nozzle type of containers. Preparation of the nozzles A for assembly with the cans preferably includes the steps of preheating the nozzles at a preheating station C (Fig. 1), applying a predetermined amount of flux to the portions of the nozzles to be secured to the cans, while the nozzles are hot, at a fluxing station D, applying a film of solder to the fluxed areas of the nozzles, while they are still hot, at a soldering station E, cooling the fluxed and solder coated nozzles at a cooling station F, refluxing the solder coated areas of the cooled nozzles at a refluxing station G, and assembling the prepared nozzles with the cans in a predetermined position thereon in readiness for the sweating operation that unites the prepared nozzles with the cans at an assembling station H.

In such a machine the various working parts are supported on a substantially T-shaped frame which includes a longitudinal frame member 21 (Fig. 1) which supports the nozzle treating and advancing devices and a transverse frame member 22 which is disposed at right angles to one end of the longitudinal frame member 21. The transverse frame member 22 supports the can advancing devices.

The nozzles A enter the machine from any suitable source of supply in a continuous single line procession moving by gravity from a greater height than shown in the drawings along a vertically curved chute 24 (Figs. 1, 2 and 4a) or moving by other equally effective known means for applying constant feeding pressure. The chute 24 is disposed adjacent the outer end of the longitudinal frame member 21 preferably at right angles thereto, the machine end of the chute being secured to a spacer block 25 bolted to the top of the frame member.

At the machine or terminal end of the chute 24, the first nozzle A in the procession of nozzles sliding down the chute moves against a guide or stop (Fig. 2) and into position under a pair of spaced and parallel horizontally disposed bar magnets 27 (Figs. 1, 2, 3, 4a, 4b and 7) which attract and hold the nozzle in suspension against the bottom face of the magnets, the tops of the nozzles being in engagement with the magnets. These bar magnets 27 overlap the chute 24 and extend the full length of the longitudinal frame member 21 and project across the transverse frame member 22.

The magnets 27 are supported in spaced relation above the tops of the frame members 21, 22 on a bracket 28 which is bolted to the frame member 21 and on a bracket 29 (Fig. 4a) secured to the spacer block 25. Magnetism for the bars is supplied preferably through an electric coil 31 (Figs. 1 and 4a) which is wrapped around a core 32 connected to the bars 27. Electric current is passed through the coil continuously from any suitable source of supply. If desired the bar magnets 27 may be of the permanent magnet type, in which case the coil 31 can be eliminated.

The nozzles A are removed from the terminal end of the chute 24 individually and are advanced in pairs in single file along the bar magnets 27 in a straight line path of travel in an intermittent or step-by-step fashion past or through a plurality of nozzle treating stations and toward the transverse frame 22 to meet pairs of cans B. This advancement of the nozzles is effected by a reciprocable nonmagnetic stroke bar 34 (Figs. 1, 2, 4a, 4b and 7) having a plurality of spaced depending feed dogs 35 projecting from the lower edge thereof. A pair of spaced and parallel nonmagnetic guide rails 37 secured to the bottom face of the bar magnets 27 guide the moving nozzles A and maintain them in a straight line.

The stroke bar 34 operates in the space between the bar magnets 27, the latter serving as guides for the stroke bar, and is located above the path of travel of the nozzles clinging to the bar magnets. This stroke bar extends for nearly the full length of the bar magnets 27 and projects beyond the magnets adjacent the transverse frame member 22 as best shown in Figs. 4a and 4b.

The stroke bar 34 is movable vertically and longitudinally in order to effect the proper advancement of the nozzles A along the bar magnets 27. For this purpose the stroke bar is supported at two spaced places along its length on a pair of lever arms 41, 42 (Figs. 4a and 4b) which are mounted on the inner ends of pivot pins 43 carried in nonmagnetic bearings 44 (see Fig. 7) secured to the top face of one of the bar magnets 27. The lever arms 41, 42 carry slide blocks 45 which operate in elongated slots 46 formed in the stroke bar and thus support the bar in suspension. The outer ends of the pivot pins 43 carry upright lever arms 47, 48 which are pivotally connected to opposite ends of a connecting rod 49 for simultaneous operation of the lever arms.

The lever arms 41, 42, 47, 48 and the pivot pins 43 to which they are secured are periodically rocked for lifting and lowering the stroke bar 34 to raise the feed dogs 35 clear of the nozzles during a return stroke of the bar and to locate the dogs in the path of travel of the nozzles during a feeding stroke of the bar in time with its reciprocation. This vertical movement of the stroke bar is brought about by cam action. For this purpose the lever arm 47 (Figs. 4a and 7) is formed with an arm 51 which is pivotally connected to the upper end of a vertical actuating rod 52.

The lower end of the actuating rod 52 is pivotally connected to a cam lever 53 which intermediate its ends is mounted on a pivot pin 54 carried in a bearing bracket 55 bolted to the longitudinal frame member 21. The opposite end of the cam lever 53 carries a cam roller 56 which operates against an edge cam 57 secured to a continuously driven shaft 58 which extends longitudinally of the frame member 21 and is journaled in bearings 59 formed in this frame member. A tension spring 61 having one end connected to the actuating rod end of the cam lever 53 and the other end secured to a lug 62 formed on the bearing bracket 55, keeps the cam roller 56 in engagement with the edge cam 57.

Reciprocation of the stroke bar 34 through a nozzle advancing stroke and then through a return stroke is effected from the end of the stroke bar that extends beyond the transverse frame member 22. This end of the stroke bar is pivotally connected to a link 65 (Fig. 4b) which in turn connects with the upper end of a vertically disposed actuating lever 66. Intermediate its ends, this lever 66 is pivotally mounted on a short shaft 67 (see also Fig. 13) carried in bearings 68 formed in the frame member 21.

The lower end of the actuating lever 66 is pivotally connected to a cam arm 71, the inner end of which is bifurcated and straddles a main drive shaft 72 (see also Fig. 5). The bifurcated end of the cam arm 71 carries a cam roller 73 which operates in a cam groove 74 of a face cam 75 secured to the main drive shaft 72. The main drive shaft 72 extends longitudinally of the transverse frame member 22 in line with the driven shaft 58 and is connected to this shaft through a pair of meshing bevel gears 76, 77 mounted respectively on the drive shaft 72 and the driven shaft 58. The drive shaft is mounted in bearings 78 (one of which is shown in Fig. 13) formed in the transverse frame member 22 and is driven continuously in any suitable manner.

Hence with such actuating devices for shifting the stroke bar 34 vertically as well as for reciprocating it, the stroke bar is first raised to clear the path of travel of the nozzles along the bar magnets 27 and while held in this raised position is reciprocated through a return or back stroke toward the left as viewed in Figs. 4a and 4b. This return stroke of the bar is continued until the first two dogs 35 (at the left in Fig. 4a) on the bar are beyond the nozzle feed-in chute 24, at which time the stroke is terminated. The stroke bar is then lowered to bring the feed dogs 35 into the path of travel of the nozzles. Upon completion of this lowering operation the stroke bar is moved forward (toward the right in Figs. 4a and 4b) through a feeding or advancing stroke.

During this advancing stroke the second feed dog 35 engages behind a nozzle A at the terminal end of the chute 24 and pushes it forward along the bar magnets 27 and between the guides 37 attached thereto. As soon as this nozzle is removed from the chute, the next nozzle in the procession slides down into position at the terminal end of the chute and on the same forward stroke of the bar 34, the first feed dog 35 engages behind this newly placed nozzle and pushes it forward along with the preceding nozzle in spaced and paired relation. One of the guide rails 37 is longer than the other and extends in front of the terminal end of the chute 24 and serves as a stop for locating the nozzles as they slide down the chute.

Thus the nozzles are removed from the chute individually but are advanced in single file pairs in spaced relation. Continued advancement of the stroke bar through its forward stroke advances the first pair of nozzles into the preheating station C of the machine. This completes one cycle of operation of the stroke bar. Repeated cycles of operation of the stroke bar advances the first pair of nozzles through the various stations as outlined hereinbefore while feeding new pairs of nozzles from the chute 24 and thus keeps a steady procession of pairs of spaced nozzles moving intermittently through the machine toward the assembly station H.

The termination of the forward stroke of the stroke bar 34 locates and leaves the first pair of nozzles A in a predetermined position at the preheating station C, over a pair of spaced heating elements 81 (Figs. 4a and 7) disposed below the path of travel of the nozzles. These heating elements 81 preferably are stationary gas burners which are secured to the top of the longitudinal frame member 21 and which are connected by a pipe 82 to any suitable source of illuminating or other suitable gas. After being once ignited the gas burns continuously and furnishes sufficient heat to preheat the nozzles to a desired temperature to faciltate reception of the flux and the solder. The nozzles remain at this preheating station for one complete cycle of operation of the stroke bar 34.

After the preheating operation, the stroke bar 34 on its next forward stroke advances the pair of preheated nozzles A along the bar magnets 27 into the fluxing station D where the nozzles remain stationary during the cycle of operation of the stroke bar. At this fluxing station the nozzles are disposed over a flux tank 84 (Figs. 4a and 8) which is secured to the top of the longitudinal frame member 21 and which contains a bath 85 of a suitable liquid flux. This flux tank 84 is equipped with a vertically movable shallow tray 86 of a depth substantially equal to the height of the flux desired to be applied to the bottom edges of the suspended nozzles A and is kept filled with flux from the tank.

The tray 86 is disposed horizontally between the nozzles and the tank and is mounted on the upper end of a vertical actuating rod 87 carried in slide bearings 88 formed in the flux tank and in the frame member 21. The lower end of the actuating rod 87 carries a cam roller 89 which operates in a cam groove 91 of a face cam 92 secured to the driven shaft 58. Through this cam 92 the tray 86 is raised and lowered once for each revolution of the driven shaft 58, this action of the tray being effected in time with the stroke bar 34, preferably during the return stroke of the bar. The tray is lifted far enough to immerse the lower ends of the nozzles into the flux in the tray for substantially the full depth of the tray and hence since the tray is kept filled with flux the same predetermined amount of flux is applied to all of the nozzles.

Maintenance of the predetermined amount of flux in the tray 86 is effected preferably by a rotatable lifter wheel 94 which rotates in the bath of the flux 85 in the tank 84. The wheel is disposed at an angle in the tank and leans toward and partially overhangs an extension 95 (see Fig. 3) of the tray 86. The inner face of the wheel is formed with an annular recess 96 to facilitate this overhang and the edge of the wheel is beveled and engaged by a non-magnetic scraper blade 97 which is secured to the adjacent bar magnet 27.

The lifter wheel 94 is mounted on the inner end of a short shaft 98 (Fig. 8) which is journaled for rotation in a bearing 99 formed in the flux tank 84. The outer end of the shaft, beyond the flux tank, carries a helical gear 101 which meshes with and is driven by a helical gear 102 mounted on and rotating with a gear shaft 103 (see also Fig. 1). The gear shaft 103 extends longitudinally of the frame member 21 and is journaled in a pair of spaced bearings 104 secured to the top and one side of the frame member. The shaft is rotated continuously by an endless chain 105 which operates over a driving sprocket 106 (see Fig. 4a) mounted on the driven shaft 58 and over a driven sprocket 107 mounted on the gear shaft 103.

In this manner of connection with the driven shaft 58, the lifter wheel 94 is continuously rotated in the bath of flux 85 and carries up or lifts a continuous film of the flux which is scraped off by the scraper 97 into the tray 86. Excess flux overflows the edges of the tray and falls back into the flux tank and thus maintains the flux within the tray at a predetermined depth for deposit onto the nozzles A.

Following the fluxing operation, the next forward stroke of the stroke bar 34 (toward the right as viewed in Fig. 4a) advances the pair of fluxed nozzles A along the bar magnets 27 and into the solder applying station E. At this station the spaced nozzles are brought to rest in a predetermined position over a bath of molten solder 111 (Figs. 1, 4a, 9 and 10) contained in a solder tank 112 secured to the top of the longitudinal frame member 21.

The solder tank 112 is formed with a pair of relatively deep cylindrical wells or recesses 114 which are maintained full of molten solder and which at their bottoms are fitted with electric heating elements 115 to maintain the solder in its molten condition. There is one of these wells 114 under each of the two nozzles A disposed at this station.

Each solder well 114 houses a vertically movable hollow piston or cup 116, the two pistons being connected by a crossbar 117 to facilitate movement of both pistons in unison. The pistons 116 are slightly less in diameter than the inside diameter of the wells. The bottoms of the pistons are open. The side walls of the pistons are formed with a plurality of inlet ports 118 which are located so that in the up position of the pistons as shown in Fig. 9 the ports will be above the top edges of the wells but still submerged in the molten solder and in the down position of the pistons as shown in Fig. 10 the ports will be below the top edges of the wells. The top walls of the pistons are formed with outlet ports 119 which are surrounded by a shallow dipping recess 121 of a depth equal to the height of the solder to be applied to the nozzles held suspended over the recesses.

Hence when the pistons 116 move down into the wells 114 (as in Fig. 10), the inlet ports 118 move down below the top edges of the wells and thereby cut off communication between the interior of the pistons and the solder surrounding the piston in the tank 112. Continued downward movement of the pistons compresses the solder segregated within the pistons and forces it upwardly through the outlet port 119 where it overflows into the dipping recesses 121 to keep these recesses filled as best shown in Fig. 10. Any excess solder overflows the outer edges of the pistons and falls back into the solder tank 112. In this manner only clean solder, confined within the pistons 116 and raised from below the surface of the solder is supplied to the dipping recesses 121. Thus the dross, scum or sludge which usually gathers on the surface of the solder is prevented from mixing with the solder and from being fed to the dipping recesses.

On the up stroke of the pistons 116, they carry the clean solder in the dipping recesses 121 up toward the bottom edges of the suspended nozzles A at this station and immerse the lower flux coated ends of the nozzles into the molten solder to substantially the full depth of the dipping recesses 121 as best shown in Fig. 9. During this up stroke of the pistons, the inlet ports 118 in the side walls thereof move up with the pistons above the top edges of the wells 114 and thus permit molten solder from the solder tank 112 to flow into the space inside the pistons to replenish the solder that was forced out through the outlet port 119 as explained above. In this manner a predetermined amount of molten solder is applied to the fluxed ends of the nozzles A for a predetermined height without any wasting of the solder.

This vertical movement of the pistons 116 is effected by cam action in time with the positioning and removal of the nozzles A at and from the soldering applying station E. For this purpose the crossbar 117 which connects the two pistons 116, is mounted on the upper end of a vertical actuating rod 124 (Figs. 4a, 9 and 10). The rod is carried in slide bearings 125 formed in the longitudinal frame member 21. The lower end of the rod carries a cam roller 126 which operates in a cam groove 127 of a face cam 128 mounted on the driven shaft 58. Through this connection the pistons 116 are raised and lowered in time with the reciprocation of the stroke bar 34.

Upon completion of the cycle of operation of the solder applying devices at the station E, the fluxed and solder coated nozzles A are advanced along the bar magnets 27 and moved into the cooling station F. This preferably is an idle station where the positioned nozzles remain at rest for one complete cycle of operation of the stroke bar 34. At this station the nozzles are exposed to the cooling effect of the surrounding air preferably at room temperature although if desired cooling devices such as an air blast or the like may be used to expedite cooling of the nozzles.

Following the cooling operation, the fluxed and solder coated nozzles A are advanced another step into the refluxing station G (Figs. 1 and 4b) where they are brought to rest over a refluxing device which is similar in construction and operation to the fluxing device located at the fluxing station D. The refluxing device includes a fluxing tank 131 (Fig. 4b) disposed on the top of the frame member 21 and contains a liquid flux 132 which is carried up from the tank by a rotatable lifter wheel 133 and scraped off into a vertically movable refluxing tray 134 located above the tank 131 in the same manner as in the fluxing device at the station D. The refluxing tray 134 is shallow and of a predetermined depth like the fluxing tray 86.

The lifter wheel 133 is carried on a rotatable shaft 135 which is journaled in a bearing in the refluxing tank and which is rotated by a helical gear 136 (Fig. 1) carried on the outer end of the shaft and meshing with a helical gear 137 carried on the gear shaft 103. The tray 134 is carried on the upper end of a vertically movable actuating rod 138 which is mounted in slide bearings 139 formed in the longitudinal frame member 21. The lower end of the rod carries a cam roller 141 which operates in a suitable cam groove formed in a face cam 142 secured to and rotating with the driven shaft 58.

Through this connection the refluxing tray 134 is moved upwardly toward the suspended nozzles A on the bar magnets 27 at the refluxing station G and immerses the fluxed and solder coated ends of the nozzles into the flux for substantially the full depth of the refluxing tray thus applying a film of the flux of a predetermined height over the solder on the nozzles. This is the refluxing operation.

When the refluxing tray 134 is lowered to its original position to clear the now fluxed, solder coated, and refluxed nozzles A, these nozzles are advanced along the bar magnets 27 another step into the assembling station H to meet the cans B on which the nozzles are to be secured.

The cans B to receive the fluxed, solder coated, and refluxed nozzles A, rest in an upright position on a long table 145 (Figs. 1, 4b, 6 and 12) supported on the transverse frame member 22 and are advanced intermittently and longitudinally of the table substantially at right angles to and below the path of travel of the nozzles, in two spaced and parallel straight line continuous processions or lanes.

The cans in each lane are arranged in spaced order. Each lane of cans is maintained in straight line formation by pairs of spaced and parallel guide rails 146 which are supported on brackets 147 bolted to the top of the table 145.

Advancement of the cans B in timed relation preferably is effected by a pair of spaced and parallel auxiliary or can stroke bars 151 which are located under the cans in longitudinal slots 152 formed in the table 145. The can stroke bars extend the full length of the table and are formed with a plurality of feed dogs 153 which project upwardly from the upper edges of the bars. The feed dogs on the two bars are aligned transversely so as to advance two cans simultaneously and in transverse alignment. These can stroke bars 151 are movable vertically as well as reciprocably in the same manner as the nozzle stroke bar 34 and are operated in time with the nozzle stroke bar.

Reciprocation of the can stroke bars 151 preferably is effected by eccentric action. For this purpose the two can stroke bars are tied together by a plate 154 (Fig. 6) having a depending lug 155 which is pivotally connected by a link 156 to an upright lever 157 (see also Fig. 13) secured to one end of a short shaft 158 carried in a bearing bracket 159 formed on the longitudinal frame member 21. The opposite end of the shaft carries a lever 161 which is connected to the outer end of an eccentric arm 162 of an eccentric ring 163 which surrounds an eccentric 164 mounted on and rotatable with the driven shaft 58. Hence as the driven shaft rotates, the eccentric 164 reciprocates the can stroke bars 151 toward the right as viewed in Fig. 6 through a can advancing or feeding stroke and thence toward the left through a return stroke.

Vertical movement of the can stroke bars 151 is effected to lower the feed dogs 153 out of the path of travel of the advanced cans on the table 145 during the return stroke of the stroke bars so as to prevent backward movement of the advanced cans and to raise the dogs into position behind the cans to engage and advance them along the table during a feeding stroke of the bars. This vertical movement of the stroke bars is effected by cam action. For this purpose the stroke bars 151 rest on pairs of longitudinally and transversely spaced support rollers 166 (Figs. 6 and 12) which are carried on yokes 167 mounted on the upper ends of vertical actuating rods 168 slideably supported in slide bearings 169 formed in the table 145 and in the transverse frame member 22.

There are two actuating rods 168 and the parts carried thereon, and they are disposed adjacent the ends of the transverse frame member 22. The lower ends of the actuating rods carry cam rollers 171 which operate against edge cams 172 mounted on and rotating with the main drive shaft 72. A compression spring 173 coiled around each of the actuating rods 168 and interposed between one of the adjacent slide bearings 169 and a collar 174 carried on each of the rods, holds the cam rollers 171 under pressure against the edge cams 172.

As the cans B received from any suitable source of supply, intermittently advance along the table 145 in pairs, one pair of cans on each forward stroke of the can stroke bars 151, is advanced into the assembly station H to receive a pair of the fluxed, solder coated, and refluxed nozzles B as mentioned hereinbefore. In the instant case the nozzles A are assembled on the tops of the cans B and for this purpose the can tops are provided with short upstanding necks J (Fig. 11) which are surrounded by annular recesses K for the reception of the prepared bottom ends of the nozzles. When a pair of cans B are advanced into the assembling station H, they are located and brought to rest with their necks J in vertical alignment with the path of travel of the nozzles A so that the necks of the cans will be directly under the two prepared nozzles A advanced into the assembling station as hereinbefore mentioned, the nozzles still clinging to the bar magnets 27.

After the cans B and nozzles A are positioned at the assembling station H, and while the can stroke bars 151 and the nozzle stroke bar 34 are moving back through their return strokes, the cans B are lifted from the table 145 into enegagement with the nozzles to locate the nozzles in the can top recesses K around the necks J. Following this the nozzles are stripped vertically from the bar magnets 27 and are pushed down with the cans as the latter are lowered through a return stroke to the table 145. In this manner the prepared nozzles are assembled with the cans and are ready for uniting with the cans by a solder sweating or other suitable operation at an advanced station in this machine or in a connecting machine.

Lifting of the positioned pair of cans B preferably is effected by a lifter pad 176 (Figs. 4b and 6) which is located in an opening 177 formed in the table 145 at the assembling station H. The top of the lifter pad normally is flush with the top of the table for easy sliding transfer of the cans from the table to the pad and vice versa. Clearance openings 178 are provided in the pad for the can stroke bars 151 which extend through the pad. This lifting pad 176 is secured to the upper end of a vertical lifter rod 181 which slides in a vertical slide bearing 182 formed in the longitudinal frame member 21. The lower end of the rod carries a cam roller 183 (see also Fig. 13) which operates against an edge cam 184 mounted on and rotatable with the main drive shaft 72. A compression spring 185 coiled around the rod 181 and interposed between the bottom of the bearing 182 and a collar 186 formed on the rod, keeps the cam roller 183 in engagement with the cam 184. Hence as the main shaft rotates, the cam 184 raises and lowers the lifter pad 176 and the two cans B thereon as hereinbefore mentioned.

The stripping of the nozzles A from the bar magnets 27 to assemble them with the cans B preferably is effected by a vertical stripper plate 188 (Figs. 4b and 6) which is slidably disposed on edge in a housing 189 secured to the top face of the bar magnets at the assembling station. The stripper plate 188 extends along the nozzle stroke bar 34 and its lower edge is formed with a longitudinal clearance opening 190 to permit the plate to straddle the stroke bar 34, and extend down adjacent the sides of the stroke bar, terminating just short of the path of travel of the nozzles along the bottom face of the bar magnets.

The stripper plate 188 is supported on an inner bifurcated end of an actuating lever 191, which end engages in grooves 192 of a lug 193 formed on the upper edge of the plate. Intermediate its ends the lever 191 is mounted on a pivot pin 194 carried in a bracket 195 formed on the housing 189. The outer end of the lever is connected by a link 196 to the upper end of a vertical actuating rod 197 supported in a pair of spaced bearings 198 formed in the longitudinal frame member 21. The lower end of the rod carries a cam roller 199 which operates against an edge cam 200 mounted on and rotatable with the drive shaft 72. A compression spring 201 coiled around the rod 197 and interposed between the lower end of one of the bearings 198 and a collar 202 carried on the rod, keeps the cam roller 199 in engagement with the cam 200.

Hence as the cam 200 is rotated in time with the other moving parts of the machine, it operates to hold the stripper plate 188 in a raised position until the cans B on the lifter pad 176 are raised from the table 145 into engagement with the nozzles A as hereinbefore mentioned. The stripper plate 188 is then moved down, by action of its cam 200, and thus presses against the tops of the nozzles A and strips them from the bar magnets 27 and continues to push the nozzles down against the cams B as the latter move down through their return to the table 145. It is this stripping action that completes the assembling of the nozzles with the cans. The stripper plate immediately returns to its elevated position to clear the incoming nozzles for the next pair of cans.

Upon the next stroke of the can stroke bars 151, the cans B with their assembled nozzles A are removed from the assembling station H and advanced one step toward the subsequent operation devices or connected machine for the uniting operation as hereinbefore mentioned. This completes the entire cycle of operation of the machine.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for assembling fittings to containers, the combination of a line of fittings treating and assembling stations; means for advancing a group of longitudinally and predeterminedly spaced fittings intermittently along a path passing along said line of treating and assembling stations, a stationary magnetic support rail disposed parallel to and substantially coextensive with said path of the fittings for holding and supporting said fittings on said rail and in treating and assembling positions at said stations, means for intermittently advancing a row of containers along a path crossing said path of the fittings with individual containers spaced apart from each other a distance equal to the spacing of said fittings, said row of containers being parallel to said path of the fittings and each container in said row being aligned by said advancing means with a fitting of said group of fittings at the intersection of said fitting and container paths during a rest period between movements of said intermittent container and fitting advancing means, and assembly means at the intersection of said paths for stripping said group of fittings from said magnetic support rail and transferring the group directly to said row of containers in prepared alignment therewith.

2. In a machine for assembling fittings to containers, the combination of a line of fittings treating and assembling stations; advancing means having longitudinally and predeterminedly spaced feed dogs arranged in groups thereon for feeding fittings in longitudinally and predeterminedly spaced relation along a path passing along said line of stations, a stationary magnetic support rail disposed parallel to and substantially coextensive with said path of the fittings for holding and supporting said spaced fittings on said rail and in treating and assembling positions at said stations, means for feeding said fittings singly onto said magnetic rail and into the path of said fitting advancing means, means for actuating said advancing means intermittently to move a said group of spaced feed dogs past said fitting feed from which they receive singly a group of fittings for advancement along said path of the fittings, means for intermittently advancing a row of containers along a path crossing said path of the fittings with individual containers spaced apart from each other a distance equal to the spacing of said fittings, said row of containers being parallel to said path of the fittings and each container in said row being aligned by said container advancing means with a fitting of said group of fittings at the intersection of said fitting and container paths during a rest period between movement of said intermittent fitting and container advancing means, and assembling means at the intersection of said paths for stripping said group of fittings from said magnetic support rail and transferring the group directly to said row of containers in prepared alignment therewith.

3. In a machine for assembling fittings to containers, the combination of a line of fittings treating and assembling stations, means for advancing a group of longitudinally and predeterminedly spaced fittings intermittently along a path passing along said line of treating and assembling stations, a stationary magnetic support rail disposed parallel to and substantially coextensive with said path of the fittings for holding and supporting said fittings on said rail and in treating and assembling positions at said stations, means for intermittently advancing a row of containers along a path crossing said path of the fittings with individual containers spaced apart from each other a distance equal to the spacing of said fittings, said row of containers being parallel to said path of the fittings and each container in said row being aligned by said advancing means with a fitting of said group of fittings at the intersection of said fitting and container paths during a rest period between movements of said intermittent container and fitting advancing means, lifter means at said intersection of the fitting and container paths for raising said row of containers into assembly with said group of spaced fittings on the magnetic rail, and stripper means for removing said assembled fittings and containers from said magnetic rail.

4. In a machine for assembling fittings to containers, the combination of a line of fittings treating and assembling stations, a fittings feed device movable along a path of travel through said stations, supply means for feeding fittings singly into said path of travel, groups of longitudinally spaced feed dogs disposed at spaced intervals along said feed device for receiving the singly fed fittings from said supply means and for advancing them along said path of travel in a single line with the fittings in predeterminedly spaced relation and in groups corresponding to said groups of feed dogs, a stationary magnetic support rail parallel to and substantially coextensive with said path of travel for holding and supporting said groups of spaced fittings as they are advanced along said path, means for intermittently advancing said feed device to move each group of fittings into and through said stations, heating means at one of said treating stations for preheating each group of spaced fittings held on said support rail, fluxing means disposed at another of said treating stations and movable toward and away from said support rail for applying a film of flux onto each group of spaced fittings, solder applying means disposed at another of said treating stations and movable toward and away from said support rail for applying a film of molten solder to said fluxed and spaced fittings, refluxing means disposed at another of said treating stations and movable toward and away from said support rail for applying a film of flux onto said solder coated spaced fittings, means at each of said stations for treating the spaced fittings in each group simultaneously while they are at rest at each station, means for feeding corresponding groups of containers arranged in rows each parallel to said path of the fittings and moving along a path of travel extending across said path of the fittings with individual containers of each row spaced apart from each other a distance equal to the spacing of said fittings, means for actuating said container feeding means intermittently to rest each group of spaced containers successively at the intersection of said paths of travel, and means for transferring a group of spaced fittings from the fitting feed device to a group of rested equally spaced containers at said intersection of said paths of travel for assembling said fittings with said containers.

5. In a machine for assembling fittings to containers, the combination of a line of fittings treating and assembling stations, a fitting feed device movable along a path of travel through said stations, supply means for feeding fittings singly into said path of travel, groups of longitudinally and predeterminedly spaced feed dogs disposed at spaced intervals along said feed device for receiving the singly fed fittings from said supply means and for advancing them along said path of travel in a single line with the fittings in predeterminedly spaced relation and in groups corresponding to said groups of feed dogs, magnetic means for holding and supporting said groups of spaced fittings as they are advanced along said path by said fitting feed device, means for intermittently advancing said feed device to move each group of spaced fittings into and through said stations, means at each of said stations for treating the fittings in each group simultaneously while they are at rest at each station, means for feeding corresponding groups of containers arranged in rows each parallel to said path of the fittings and moving along a path of travel extending across said path of the fittings with individual containers of each row spaced apart from each other a distance equal to the spacing of said fittings, means for actuating said container feeding means intermittently to rest each group of spaced containers successively at the intersection of said paths of travel, and means for transferring a group of spaced fittings from the fittings feed device and said magnetic means to a group of rested equally spaced containers at said intersection of said paths of travel for assembling said fittings with said containers.

WILLIAM W. MAHER.

References Cited in the file of this patent

UNITED STATES PATENTS

| Number | Name | Date |
|---|---|---|
| 1,103,067 | McColl | July 14, 1914 |
| 1,200,272 | Taylor | Oct. 3, 1916 |
| 1,534,677 | Assmann | Apr. 21, 1925 |
| 1,599,981 | Alexanderson | Sept. 14, 1926 |
| 1,705,971 | Gray | Mar. 19, 1929 |
| 1,783,642 | Ferguson | Dec. 2, 1930 |
| 1,876,821 | Dugan | Sept. 13, 1932 |
| 2,183,287 | Candee | Dec. 12, 1939 |
| 2,535,853 | Hermani | Dec. 26, 1950 |

FOREIGN PATENTS

| Number | Country | Date |
|---|---|---|
| 101,046 | Germany | Jan. 23, 1899 |